US007865955B2

(12) United States Patent
Moon et al.

(10) Patent No.: US 7,865,955 B2
(45) Date of Patent: Jan. 4, 2011

(54) APPARATUS AND METHOD FOR EXTRACTING SIGNATURE CANDIDATES OF ATTACKING PACKETS

(75) Inventors: Hwa Shin Moon, Daejeon (KR); Sung Won Yi, Seoul (KR); Jin Tae Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 692 days.

(21) Appl. No.: 11/924,100

(22) Filed: Oct. 25, 2007

(65) Prior Publication Data
US 2008/0120721 A1    May 22, 2008

(30) Foreign Application Priority Data
Nov. 22, 2006    (KR) ...................... 10-2006-0115960

(51) Int. Cl.
*G06F 11/00* (2006.01)
*G06F 12/14* (2006.01)
*H04L 9/00* (2006.01)

(52) U.S. Cl. .............................. 726/23; 726/24; 726/25; 726/26; 726/27; 713/168; 713/169; 713/170; 713/171; 713/174

(58) Field of Classification Search ..................... 726/23
See application file for complete search history.

(56) References Cited

U.S. PATENT DOCUMENTS 5,440,723 A    8/1995    Arnold et al.
6,279,113 B1 *  8/2001    Vaidya .......................... 726/23
2003/0145225 A1    7/2003    Bruton, III et al.
2005/0229254 A1 * 10/2005    Singh et al. .................... 726/23
2006/0123480 A1 *  6/2006    Oh et al. ........................ 726/23

FOREIGN PATENT DOCUMENTS

KR    2004-102489    12/2004

\* cited by examiner

*Primary Examiner*—Longbit Chai
(74) *Attorney, Agent, or Firm*—Ladas & Parry LLP (57) ABSTRACT

An apparatus and method for extracting signature candidates and optimizing a corresponding signature are provided. The apparatus includes a packet separator, a header parser, a traffic information generator, a substring extractor, and a signature candidate extractor. The packet separator separates a packet into a header and a payload. The header information parser parses the header information, and the traffic information generator generates traffic information. The substring extractor measures a frequency of appearing of a substring with a predetermined length in the separated payload for a constant observation period, and extracts a substring having a frequency higher than a predetermined setup value by updating the measured frequency information to a substring frequency table. The signature candidate extractor generates a signature by collecting the extracted substring information and the generated traffic information, updates a signature frequency table, and extracts a signature candidate with reference to information of the signature frequency table.

31 Claims, 6 Drawing Sheets

APPARATUS AND METHOD FOR EXTRACTING SIGNATURE CANDIDATES OF ATTACKING PACKETS

CLAIM OF PRIORITY

This application claims the benefit of Korean Patent Application No. 10-2006-115960 filed on Nov. 22, 2006 in the Korean Intellectual Property Office, the disclosure of which is incorporated herein by reference.

BACKGROUND OF THE INVENTION

1. Field of the Invention

The present invention relates to an apparatus and method used for generating a signature of a network attacking packet and, more particularly, to an apparatus and method for extracting signature candidates and optimizing a corresponding signature for protecting a target network from a malicious program or use.

This work Was supported by the IT R&D program of MIC/IITA[2006-S-042-01, Development of Signature Generation and Management Technology against Zero-day Attack]

2. Description of the Related Art

In general, a technology for detecting an attacking packet is divided into an anomaly detection scheme and a signature detecting scheme. Although the anomaly detection scheme can detect unknown attacks, the anomaly detection scheme has a disadvantage of having a high false positive that is a rate of data falsely determined as attack by a system in entire normal data. On the contrary, the signature detection scheme has a high accuracy but cannot detect unknown attacks. When a new attack is generated, the signature detection scheme takes a long time to generate a signature. In order to overcome such shortcomings of the above described two schemes, another conventional technology was introduced, which automatically generates a signature for a corresponding attack by analyzing network packets when an attack is generated on a related network.

In order to generate a signature, it needs to analyze the payloads of packets. In case of early stage worms, attacking packets have identical payloads or having a predetermined identical part in the payloads. As the attack has become intelligent like as a polymorphic worm, the attacking packets having the same payloads become significantly reduced, and the location of the identical part of the payload also changes.

Representative technologies for detecting attacking packets and generating signatures therefore can be summarized into following three technologies.

As the first conventional technology, an early bird was introduced. The early bird extracts signature candidates from entire network traffics. While extracting the candidates, each network packet is divided into substrings with a predetermined constant length (k-byte). Herein, each substring is separated using a moving window scheme. That is, the first substring is formed of bytes from the first byte to the $k^{th}$ byte in a payload of a corresponding packet. The second substring is formed of bytes from the second byte to the $(k+1)^{th}$ byte. If the payload size of a corresponding packet is x, total x−k+1 strings are generated. The results of hashing combinations of the information in the separated substrings and the header field of a corresponding packet are used as an analysis unit. These values are sampled at, for example, 1/64, and the frequency of a corresponding hashing value is recorded in an additional table. Then, a value frequently appeared at a network among the hash values in the table is extracted as a signature candidate. Based on the extracted signature candidates, a final attacking signature is generated through analyzing the address dispersion of packets and correlation thereof.

As the second conventional technology, an autograph was introduced. The autograph extracts signature candidates only from traffics of sessions that are doubtful as attack, for example, from accesses that unsuccessfully establish a related session, among sessions accessing a network. In order to discriminate the attack-doubtful session, abnormal detection schemes such as a portscan scheme are used. In the portscan scheme, payloads of corresponding sessions are sequentially combined according to the attack-doubtful session, the combined one long string is separated using a content-based payload partitioning (COPP) scheme, and signature candidates are extracted from substrings as an analysis unit. Then, a final attacking signature is generated based on the number of the attack-doubtful sessions. The COPP scheme defines an anchor value with a predetermined value, and separates substrings from a location of a packet where the defined anchor is shown. For example, a string from the $k^{th}$ anchor to the $(k+1)^{th}$ anchor is separated as a substring. Therefore, the lengths of substrings are different in case of the COPP scheme.

As the third conventional technology, a polygraph was introduced. The polygraph is an extended autograph technology for applying the autograph into a polymorphic worm. The polygraph extracts signature candidates from traffics doubtful as attack like as the autograph. The signature candidates are extracted by applying a longest substring algorithm is applied to the same type of attack flows. Herein, the extracted signature candidates are longest substrings belonging to more than k flows among total n flows. The polygraph introduces a method of combining the extracted signature candidates as a method of optimizing a signature. The introduced combining method includes a method of generating a combining type signature without a predetermined order, a method of generating a combining type signature with a predetermined order, and a method of statistically generating a combining type signature. The autograph and polygraph can advantageously detect an attacking signature appeared through more than two consecutive packets by reassembling packets in one session and using the reassembled packets. On the contrary, it is difficult to embody the autograph and the polygraph for a high speed network due to a processing power for reassembling a session and a memory access delay.

Hereinafter, the problems of conventional technologies will be described.

The autograph and polygraph extract signatures only from flows detected by the anomaly detection. Therefore, the autograph and polygraph have the false negative of the abnormally detection. Herein, the false negative is a rate of data falsely decided as normal data among entire attacking data. Theses methods use a method of reassembling founded traffic flows and finding commonly used strings on the reassembled traffic flow. Therefore, the complexities of two methods are closely related to the number of the founded traffic flows. That is, if the false negative is lowered, the number of flows becomes increased, thereby taking a longer time to process. On the contrary, if the false negative is raised, the processing time becomes shortened but the false negative for the extracted signature candidates increases. Currently, these methods use an abnormally detection scheme for detecting a scanning worm. As described above, these two methods perform analysis after reassembling flows. Therefore, the flow reassembly must be embodied as hardware in order to embody these two methods as hardware.

Furthermore, the all packet contents of each flow must be stored. Therefore, a large quantity of memory is required to store the contents thereof in case of greatly generating abnormal flows. If an allowable resource quantity is exceeded as the number of flows increases, the false negative of extracting results may increase. In case of the autograph, a COPP method is used to discriminate the flows in an analysis unit. The COPP method is weak against to a polymorphic attack. In case of the polygraph, a suffix tree is used to classify flows in an analysis unit. The autograph method has a computation complexity in proportional to the sum of lengths of flows having the same abnormal feature to build the suffix tree. In order to disassemble a suffix tree after building the suffix tree, the suffix tree is required to be traversed. Such a traversing process requires many memory accesses, and it is difficult to embody the autograph in on-line based hardware.

The early bird checks all traffics, and extracts frequently shown strings as signature candidates. Therefore, the early bird has a better false negative than the autograph and polygraph. Also, the early bird can be embodied in hardware, basically. However, this system is weak against the polymorphic worm. That is, in order to deal with a polymorphic attack, the payload of a network packet is divided into short units, and the divided short units are analyzed. In this method, an analysis process is performed on entire packets or a 40 byte-long string, or a sampling process is performed. If the analysis object is long, they are seldom shown on the network traffic except an application program header.

Therefore, if a predetermined analysis object is frequently shown, it can be identified as a case of really appearing the analysis object frequently or a case of frequently generating hash collision. Herein, the number of extracted signature candidates can be significantly reduced by removing the case of frequently generating hash collisions. However, if a predetermined analysis object is frequently shown when the length of analysis object is shortened, most of cases are that the predetermined analysis object is really frequently shown on a network. That is, the early bird is not an effective method to remove the hash collision. Also, the number of outputs in this step is remained as a large number. It increases the number of entries to be analyzed in later and causes a problem in a hardware system operated with limited resources.

SUMMARY OF THE INVENTION

The present invention has been made to solve the foregoing problems of the prior art and therefore as aspect of the present invention is to provide a signature candidate extracting apparatus and method, which can be embodied in hardware having a capability to be driven through on-line in consideration of a continuous increasing network speed, and for dealing with attacks in real time through extracting signature candidates.

It is another aspect of the invention to provide a signature candidate extracting apparatus and method for extracting attacking packets that have a low false negative and deal with a polymorphic worm.

According to an aspect of the invention, the invention provides an apparatus for extracting attacking packet signature candidates including: a packet separator for separating a network packet into a header and a payload; a header information parser for parsing the header information; a traffic information generator for generating traffic information based on the parsed value; a substring extractor for measuring a frequency of appearing of a substring with a predetermined length in the separated payload for a constant observation period, and extracting a substring having a frequency higher than a predetermined setup value by updating the measured frequency information to a substring frequency table; and a signature candidate extractor for generating a signature by collecting the extracted substring information and the generated traffic information, updating a signature frequency table, and extracting a signature candidate with reference to information of the signature frequency table.

According to another aspect of the invention for realizing the object, there is provided a method for extracting an attacking packet signature candidate including: separating a network packet into a header and a payload; parsing the header information; generating traffic information based on the parsed value; measuring a frequency of appearing substrings with a predetermined length in the separated payload for a predetermined observation period and updating a substring frequency table with the measured frequency information; extracting a substring with a predetermined length based on information about the updated substring frequency table; generating a signature by collecting the extracted substring information and the generated traffic information, and updating the generated signature information to a signature frequency table; and extracting a signature candidate with reference to information of the signature frequency table.

Furthermore, the signature candidate extracting apparatus and method can be used as a part of a network router or a part of a network security device. Moreover, the signature candidate extracting apparatus and method can be embodied in hardware manner in a super high speed network.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Certain embodiments of the present invention will now be described in detail with reference to the accompanying drawings.

Throughout the specification, the like reference numerals designate like elements in the accompanying drawings.

Figure 1:
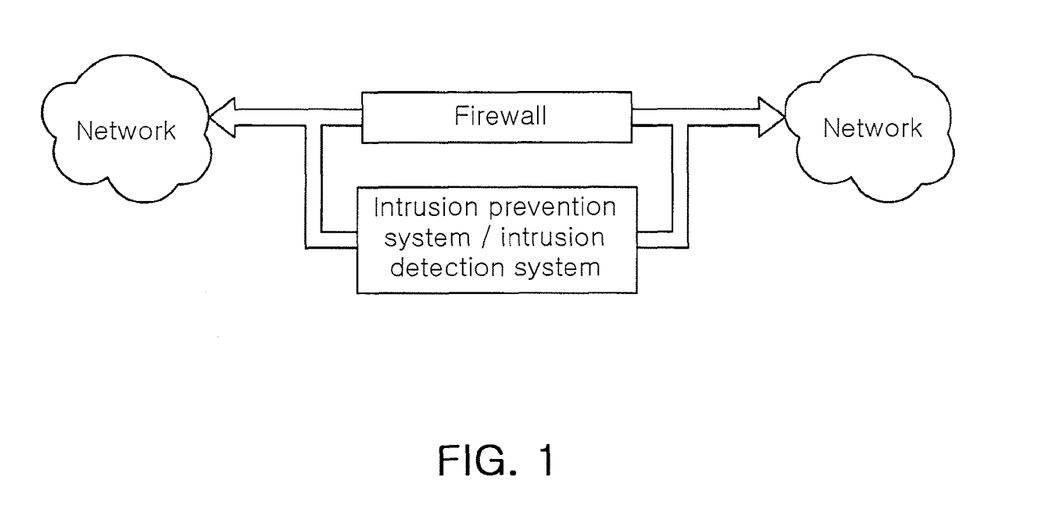
FIG. 1 is a diagram illustrating an intrusion detection and prevention system that uses a signature candidate extracting apparatus and method according to an embodiment of the present invention in a real network.

FIG. 1 is a diagram illustrating an intrusion detection and prevention system that uses a signature candidate extracting apparatus and method according to an embodiment of the present invention in a real network. Referring to FIG. 1, security devices for network such as a firewall, an intrusion detection system, and an intrusion prevention system are disposed at each junction of networks.

The networks shown in FIG. 1 may be a network open to public such as the Internet or a network close to public such as a private network for an organization, a company, or a school. The system using the signature candidate extracting apparatus and method according to certain embodiments of the present invention is disposed at the same location of a conventional security device for a network. Signatures generated by an attack signature generating technology including the signature extracting method according to an embodiment of the present invention can be applied into the conventional security devices.

Figure 2A:
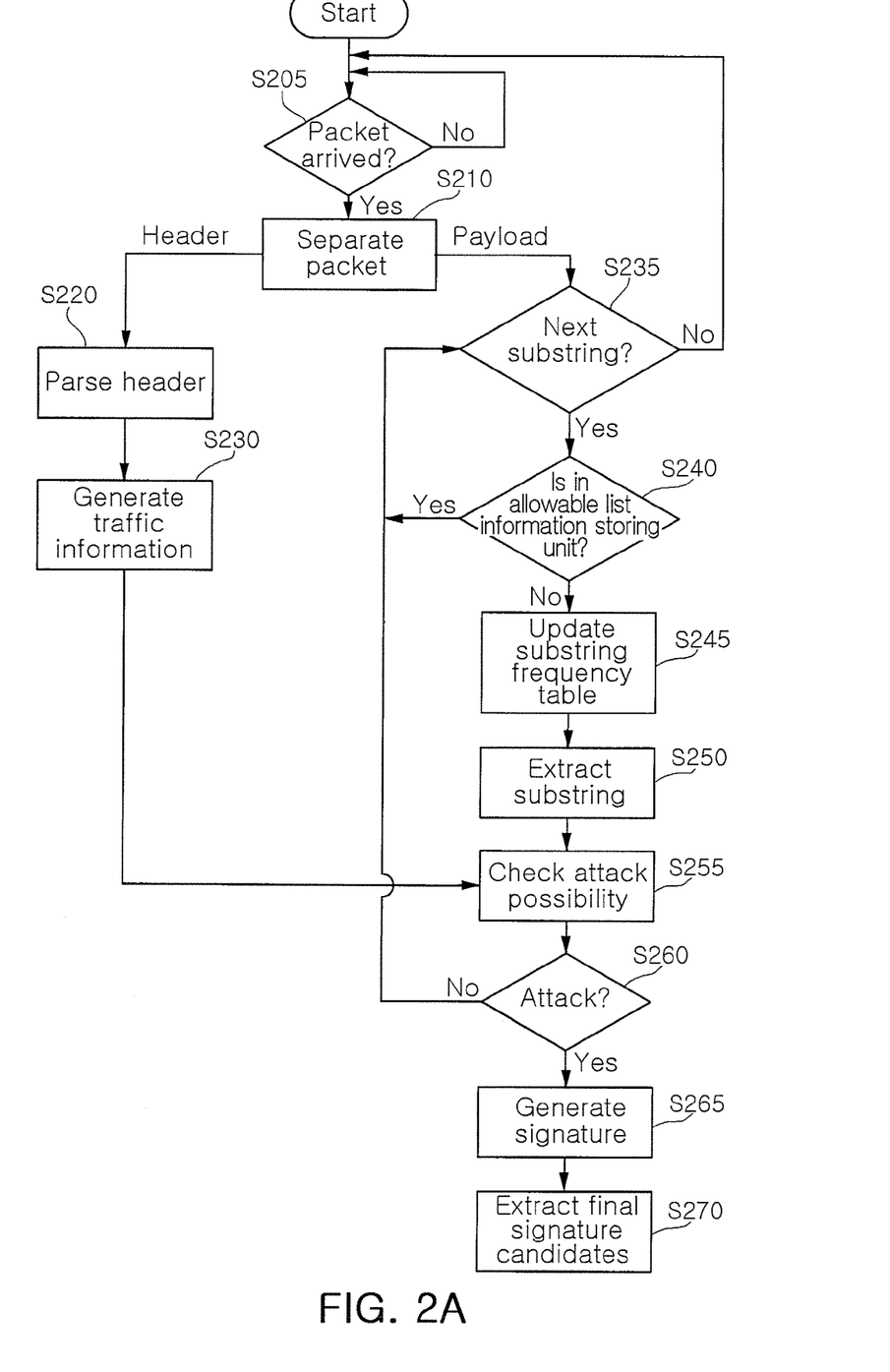
FIG. 2A is a flowchart illustrating a method of extracting an attacking packet signature candidate according to an embodiment of the present invention.

FIG. 2A is a flowchart illustrating a method of extracting an attacking packet signature candidate according to an embodiment of the present invention.

Referring to FIG. 2A, when a packet is arrived at step S205, the packet is separated into a header and a payload at step S210. Then, the separated header is parsed at step S220. The parsed information is used to generate traffic information at step S230, and the generated information is transmitted to be used for checking an attack possibility at step S255. Also, the separated payload is inspected whether the separated payload includes a substring or not at step S235, and whether an allowable list includes it or not at step S240. If the separated payload is not included in the allowable list, a substring frequency table is updated at step S245, a substring with a high frequency is extracted at step S250, and the updated substring frequency table and the generated traffic information are used to inspect the attack possibility thereof at step S255. If it determines that there is the attack possibility at step S260, a signature is generated at step S265 and a total signature candidate is extracted at step S270.

Hereinafter, each of the steps will be described in more detail.

When a packet is arrived at a network at step S205, the packet is separated to a header and a payload at step S210. The separated header information is pared at step S220. That is, each field values in the header are passed. The major interested fields in the header are a destination address, a source address, a source port number, a protocol, a packet length, and a transmission control protocol (TCP) flag value.

The parsed values are combined, thereby generating traffic information at step S230. In the traffic information generation step S230, the traffic information is generated by a combination formed of at least one of the destination address, the source address, the source port number, a protocol, a packet length, and a TCP flag value. For example, a combination formed of <source address, protocol, and destination port number> or another combination formed of <destination address, protocol, destination port number> is generated. In more specific, <destination address A, TCP> denotes information about TCP packets received at the destination address A for a predetermined observation time.

The entry of traffic information basically includes address dispersion information. When the address dispersion information is included in the combination of a source address and related information, the address dispersion information denotes the number of addresses accessing different destinations where packets satisfying a corresponding combination are transmitted to. On the contrary, when the address dispersion information is included in the combination of a destination address and related information, the address dispersion information denotes the number of addresses according sources that transmit packets satisfying a corresponding combination to a corresponding destination. Herein, the number of accessing addresses denotes the number of addresses each having a connection to a corresponding address for an observation period. For example, the number of accessing addresses having <destination address A, TCP> denotes the number of different source addresses transmitting TCP protocol packets to the destination A. On the contrary, the number of accessing address having <source address A, TCP> denotes the number of different destination addresses where a source A transmits TCP packets to.

The entry of the traffic information may further include at least one of the sum of bytes of related traffic, the number of packets, the number SYN packets where SYN is a flag declared when a connection is established, the number of FIN packets where FIN is a flag declared when a connection is released, the number of RST packets where RST is a flag declared when a connection is abnormally terminated, the number of access failures, the number of access successions, and the number of accessing addresses. However, the information of the entry of the traffic information is not limited thereto. According to the capability of a corresponding information generator, the information may further include session analysis information or access failure rate. When the traffic information is generated based on the parsed information from the header of the packet, the entry of the traffic information is updated and the attack possibility is inspected at step S260.

Meanwhile, if the payload, which is separated from a corresponding packet at step S205, does not include substrings at step S235, it prepares to analyze a next packet. If the payload includes other substrings at step S235, a substring is searched from the payload, the searched substring is inspected whether the substring satisfies a predetermined condition or not, and it determines whether the searched substring is extracted or not. In the present embodiment, the length of the extracted substring can be sustained to be short to deal with a polymorphic attack while searching a substring in a payload. The length of the substring can be adjusted by setups, and it is preferable to set the length of substring as about 2 bytes to about 7 bytes. If a longer substring is extracted, the vulnerability for the polymorphic attack becomes greater. In the present embodiment, the substring is searched by performing an overlapping method that slides a window having the same size of a substring to search a substring to extract. In this case, a location of a substring in a payload can be detected from an offset value of a current window. As the same scheme, the location of other substrings having the same size of the substring can be detected. Therefore, all of the substrings having the same size can be searched.

Afterward, it inspects whether the searched substring is a substring stored in an allowable list information storing unit or not at step S240. The contents stored in the allowable list information storing unit are substrings that are frequently generated or known as normal substrings. Such contents thereof can be managed by a user, or can be automatically managed through a signature optimizing system that will be performed after the signature extracting method according to the present embodiment. For example, the entry of the allowable list information storing unit may be formed by including any combination formed of a protocol, a port, and an IP address. That is, at the step S240, it inspects whether an entry matched to the header information of a current packet is stored in the allowable list information storing unit or not. If there is an entry matched to the header information after inspecting, the stored information is compared with a corresponding substring to determine whether they are identical or not. If they are identical, a corresponding substring is not extracted, and the step S235 is performed again to prepare to analyze a next substring. If a next substring is not present, a next packet is analyzed. The step S240 for managing the allowable list information storing unit and determining whether the substring information is present or is not essential step in the present embodiment. However, since the entry in the real allowable list information storing unit disorders the substring dispersion in a substring frequency table, it is prefer to previously remove it to accurately extract candidates.

If the currently analyzed substring is not included in the allowable list information storing unit, the detected information is updated at the substring frequency table in order to measure the frequency of a predetermined substring shown in a network for a predetermined observation period at step S245 and a substring having a frequency higher than a predetermined value is extracted at step S250. Then, the traffic information related to the extracted substring and an entry value of a corresponding substring frequency table are used to inspect the attack possibility of the substring at step S255. The configuration of the substring frequency table and the operation for updating the corresponding entry value of the substring frequency table will be described with reference to FIG. 2B.

Figure 2B:
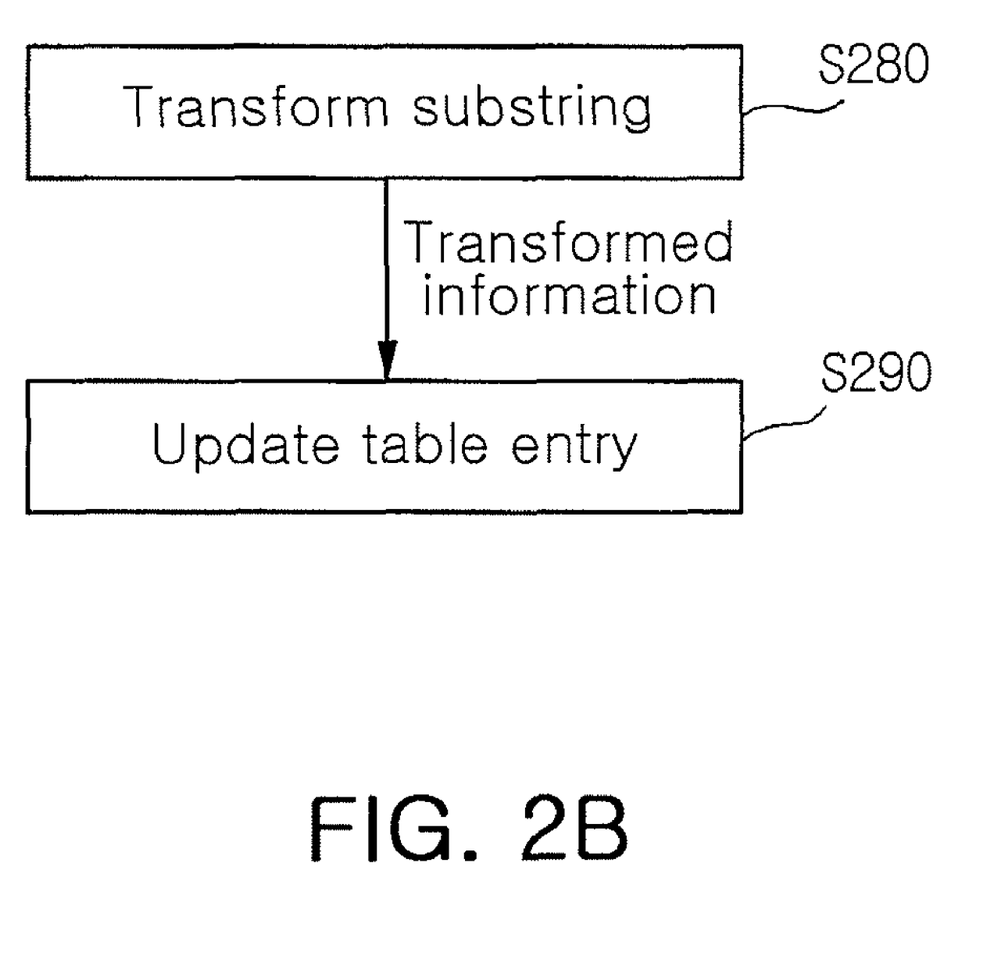
FIG. 2B is a flowchart illustrating an operation for reflecting a substring to a substring frequency table according to an embodiment of the present invention.

FIG. 2B is a flowchart illustrating an operation for reflecting a substring not present in an allowable list information storing unit to a substring frequency table according to an embodiment of the present invention.

The substring not present in the allowable list information storing unit at step S245 is transformed at step S280. For example, the substring may be transformed to a numeral value using one of a one-to-one transform method and a many-to-one transform method according to the length of a substring. If the length of a substring is 2 bytes, the total number of branches that a corresponding substring can have is about 64 k. Since this space is small enough to be sufficiently sustained, the one-to-one transform method is performed in case of a two-byte long substring. Although the two-byte long substring can be processed without transforming it, the substring is transformed because the computation of the numeral values is much easier than the computation of the string. The one-to-one transform method of two byte-long substring treats the string as an unsigned short value. If the length of the substring is longer than two bytes, it is difficult to configure hardware to have a sufficient space to have values of the substring. Therefore, the many-to-one transform method is performed for the substring longer than the two-byte long substring. A parsing is used for the many-to-one transform. The entry of the substring frequency table, which is pointed by data generated after transforming the substring using one of the one-to-one transform method and the many-to-one transform method, is updated at step S290.

Then, the attack possibility of the substring included in the currently analyzing packet is determined based on two input values including the generated traffic information and the extracted substring at step S255. If the substring does not have the attack possibility at step S260, the step S235 is performed again for extracting a next substring. On the contrary, if the substring has the attack possibility, a signature including a corresponding substring and packet header information is generated at step S265. For example, it is possible to set to generate a signature when a predetermined condition is satisfied as follows. The entry information and the frequency of a substring frequency table are analyzed. A signature is generated only if the frequency is higher than a predetermined value. Furthermore, a signature is generated only if the generated traffic information satisfies a predetermined reference.

For example, a signature is generated if a substring has frequency higher than a predetermined value, if a corresponding packet has a predetermined destination address or a port number in a predetermined range, if a source address transmitting a corresponding packet transmits packets to a plurality of destination addresses with a corresponding destination port, or a source address transmitting a corresponding packet has a low accessing success rate of traffic transmitted to a corresponding destination port. Such references can be controlled according to certain situations related to the constant references.

The generated signatures are managed at the signature frequency table, and final signature candidates are extracted with reference to the information of the table at step S270. At the step S270, the frequency of generating a corresponding signature is inspected whether it is higher than a predetermined setup value, compares the traffic information with predetermined conditions whether the traffic information is matched with the predetermined conditions or not, and an attack possibility thereof is inspected. The extraction of signature candidates will be described in more detail with reference to FIG. 5 in later.

The setting value that is a reference used for searching and extracting the substring, or setting values or conditions used for inspecting the attack possibility of the substring before extracting the signature candidates can be adjusted. The adjustment process is performed independently from the steps S205 to 207, and it may be performed according to a related situation. For example, the setting values and the conditions are controlled using a rate of newly generating entries in the signature frequency table, the frequency of a signature frequency table entry, and the traffic information of a corresponding packet.

Figure 3:
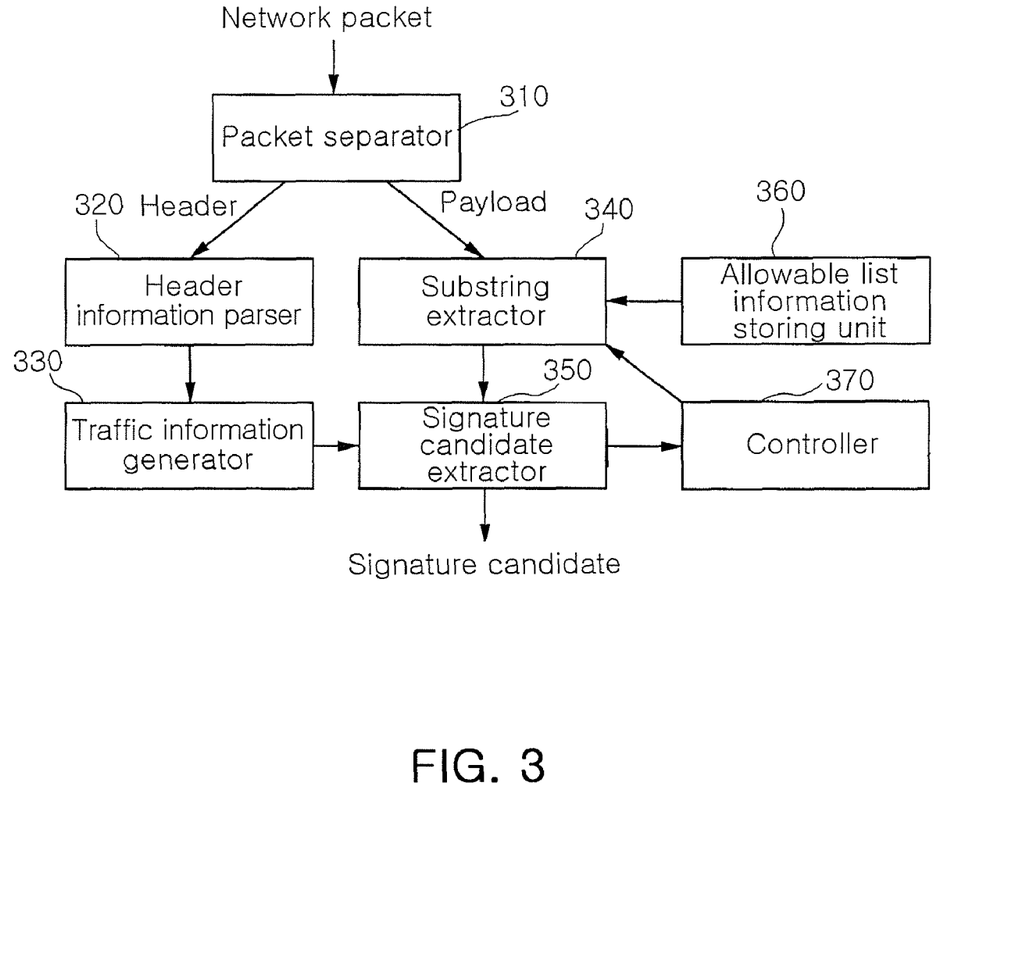
FIG. 3 is a block diagram illustrating an attacking packet signature candidate extracting apparatus according to an embodiment of the present invention.

FIG. 3 is a block diagram illustrating an attacking packet signature candidate extracting apparatus according to an embodiment of the present invention.

Referring to FIG. 3, the signature candidate extracting apparatus according to the present embodiment includes a packet separator 310, a header information parser 320, a traffic information generator 330, a substring extractor 340, a signature candidate extractor 350, an allowable list information storing unit 360, and a controller 370.

The packet separator 310 separates a packet into a header and a payload when the packet inputs to a network. Then, the packet separator 310 transfers the separated header to the header information parser 320 and transfers the separated payload to the substring extractor 340.

The header information parser 320 parses the information of the header and transmits the parsed information to the traffic information generator 330.

The traffic information generator 330 generates network traffic information based on the input parsing value, updates the entry of the traffic information, and transfers the input information and the traffic information of the related system to the signature candidate extractor 350.

The substring extractor 340 extracts substrings from the payload transferred from the packet separator 310. The allowable list information storing unit 360 stores information about strings not having the attack possibility. The substring extractor 340 may interrupt processes related to a corresponding substring if the substring information is present at the allowable list information 360. It is for removing unnecessary processes for determining a corresponding substring when the characteristic of the attacking packet is not present. The substring extractor 340 finds a substring not present at the allowable list information storing unit 360 and updates the substring frequency table.

The found substrings become the input values of the signature candidate extractor 350 with the traffic information. Accordingly, the packet payload and the packet header are simultaneously processed.

The signature candidate extractor 350 generates signature candidates doubtable as an attacking pattern from the two input values, and the reference values for generating the candidates are adjusted according to the current states. The header information process is performed once per an input packet, and the packet payload analyzing process is performed for all substrings extracted from a corresponding payload.

The controller 370 controls the setup value used to process a substring in the substring extractor 340 with reference to the processing result of the signature candidate extractor 350. The setting value is controlled to reduce resources to be wasted and to reduce the false negative by extracting substrings satisfying a predetermined condition. After finishing processing all substrings, a next packet of a network is analyzed.

Figure 4A:
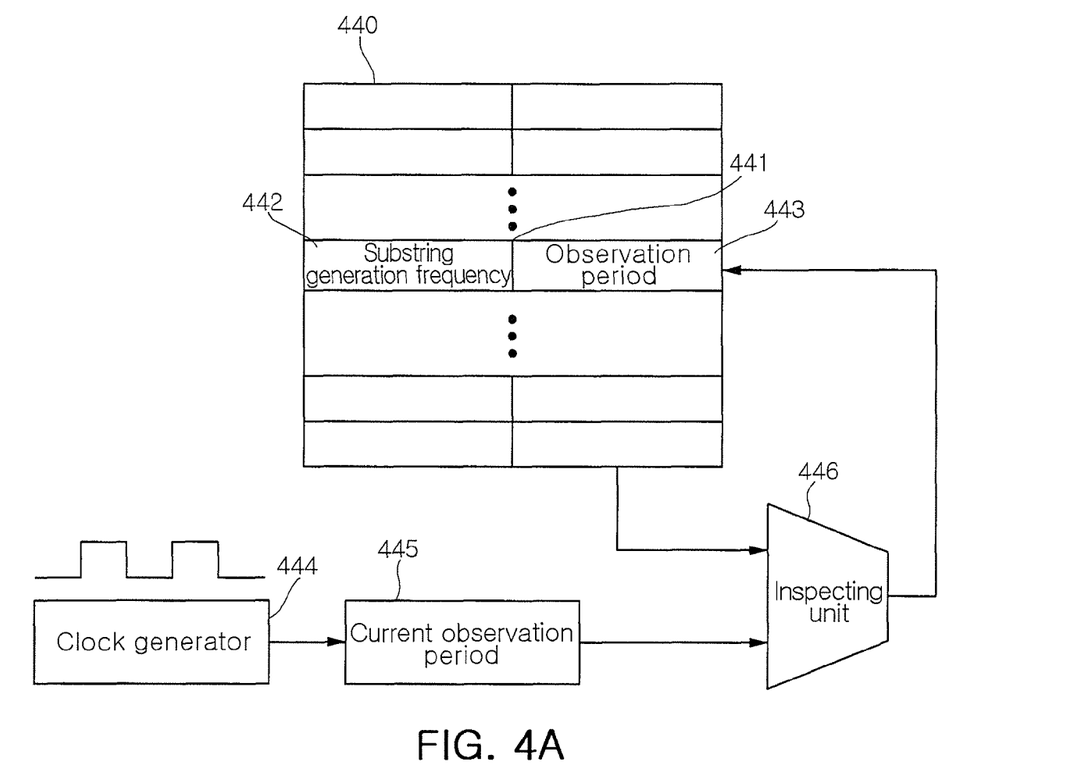
FIG. 4A is a block diagram illustrating a substring frequency table and a substring extractor according to an embodiment of the present invention.

FIG. 4A is a block diagram illustrating a substring frequency table and a substring extractor 340 according to an embodiment of the present invention. The substring frequency table 440 manages the frequency of generating a corresponding substring per an observation period. Therefore, the frequency of each entry is initialized whenever an observation period is elapsed. Such an initialization operation can be performed according to a policy employed by a related system. If the system employs a policy that considers only the frequency in a corresponding observation period, the frequency of entry is set to 0 whenever the observation period is elapsed. If the system employs a policy that the frequency in a predetermined part of a previous observation period is reflected, an exponentially weighted moving average (EWMA) is used to control a corresponding entry value. However, it is not proper to initialize all entries in a table every time an observation period is passed for an on-line system. Therefore, it is preferable to initialize a corresponding entry after confirming the observation period per each entry.

In order to overcome such a shortcoming, each entry 441 in the substring frequency table 440 includes a substring generation frequency field 142 and an observation period field 443 having a value denoting an observation period related to a most recently inputted packet having a substring related to a corresponding entry. When the substring frequency table 440 receives information transformed from a substring, an inspecting unit 446 compares the observation period value 443 of a entry 441 pointed by the corresponding information and a value 445 of a current observation period. If two values are identical, the frequency of corresponding information increases. If two values are different, it means that a related observation period is already passed. Therefore, the frequency thereof is adjusted according to a related policy, for example, the frequency is initialized, and the frequency increases from the adjusted value. In this case, the value 443 denoting a most recently generated observation period is transformed to the value 445 denoting a current observation period.

Herein, it determines whether a related observation period is passed or not based on a clock cycle and the number of clocks generated from a clock generator 444. If the clock cycle is 1 and the observation period is one minute, it informs that the observation period is elapsed whenever 60 clocks are generated. Then, the current observation period value 445 changes at a time of passing an observation period. The value 445 can be expressed as one integer and can be adjusted to increase by one whenever the corresponding observation period is passed. In the predetermined embodiment, the frequency of each substring or the frequency of information transformed from a substring basically increase by one. However, an increment amount may change according to the importance of a substring. In general, there is a great possibility that an attacking pattern is a pattern not previously shown. Therefore, a method of increasing the frequency of information that is seldom shown previously by a larger increment amount may be selected. For example, if different increment amounts are provide according to each substring, a corresponding increment amount is in reverse proportional to a value related to the number of substrings. The value related to the number of substrings gives a larger weight to the frequency generated at a recent observation period and may be standardized for the traffic amount.

Figure 4B:
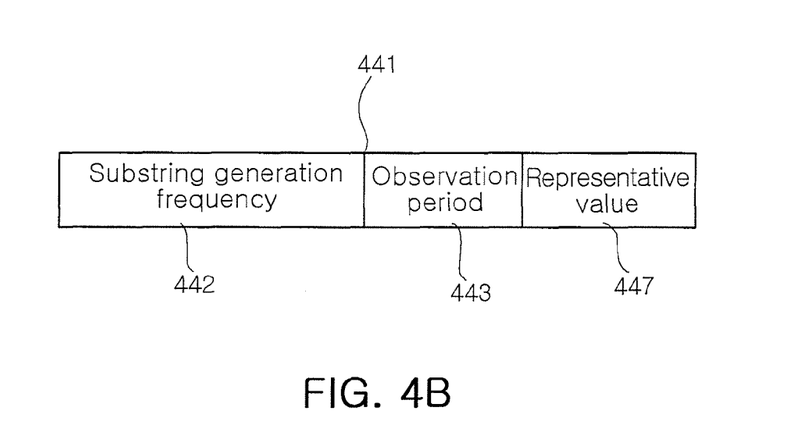
FIG. 4B is a block diagram illustrating a substring frequency table according to an embodiment of the present invention.

FIG. 4B is a block diagram illustrating a substring frequency table when an increment amount differs according to each substring according to an embodiment of the present invention.

Referring to FIG. 4B, in order to decide the increment amount for a frequency of each entry, each entry 441 in a substring frequency table 440 may further include a representative value field 447 that denotes the frequency of appearing of a substring for a comparative long time as well as two values 442 and 443. The observation period field 443 is updated with the most recent observation period information. When a corresponding entry is accessed, the value of the observation period field 443 is read, and the read value is compared with a representative value of a current observation period. If the two values are not identical, it determines that a corresponding observation period is passed. The representative value 447 is calculated at a time elapsing an observation period for each entry. For example, the representative value 447 can be decided based on Eq. 1.

$$X_{t+1} = \alpha * X_t + (1 - \alpha) * \frac{f_t}{N_t} \quad \text{Eq. 1}$$

In Eq. 1, $X_t$ denotes a representative value of an observation period t of a predetermined entry, $f_t$ denotes the frequency of data generated for a corresponding observation period, and $N_t$ denotes the total number of strings inspected for a corresponding observation period. $X_{t+1}$ denotes a representative value for an observation period t+1. However, Eq. 1 is only an example for calculating a representative value, and the calculating the representative value is not limited thereto. The increment amount for a frequency of a corresponding entry is set to be small if the representative value is large, and is set to be large if the representative value is small.

Figure 5:
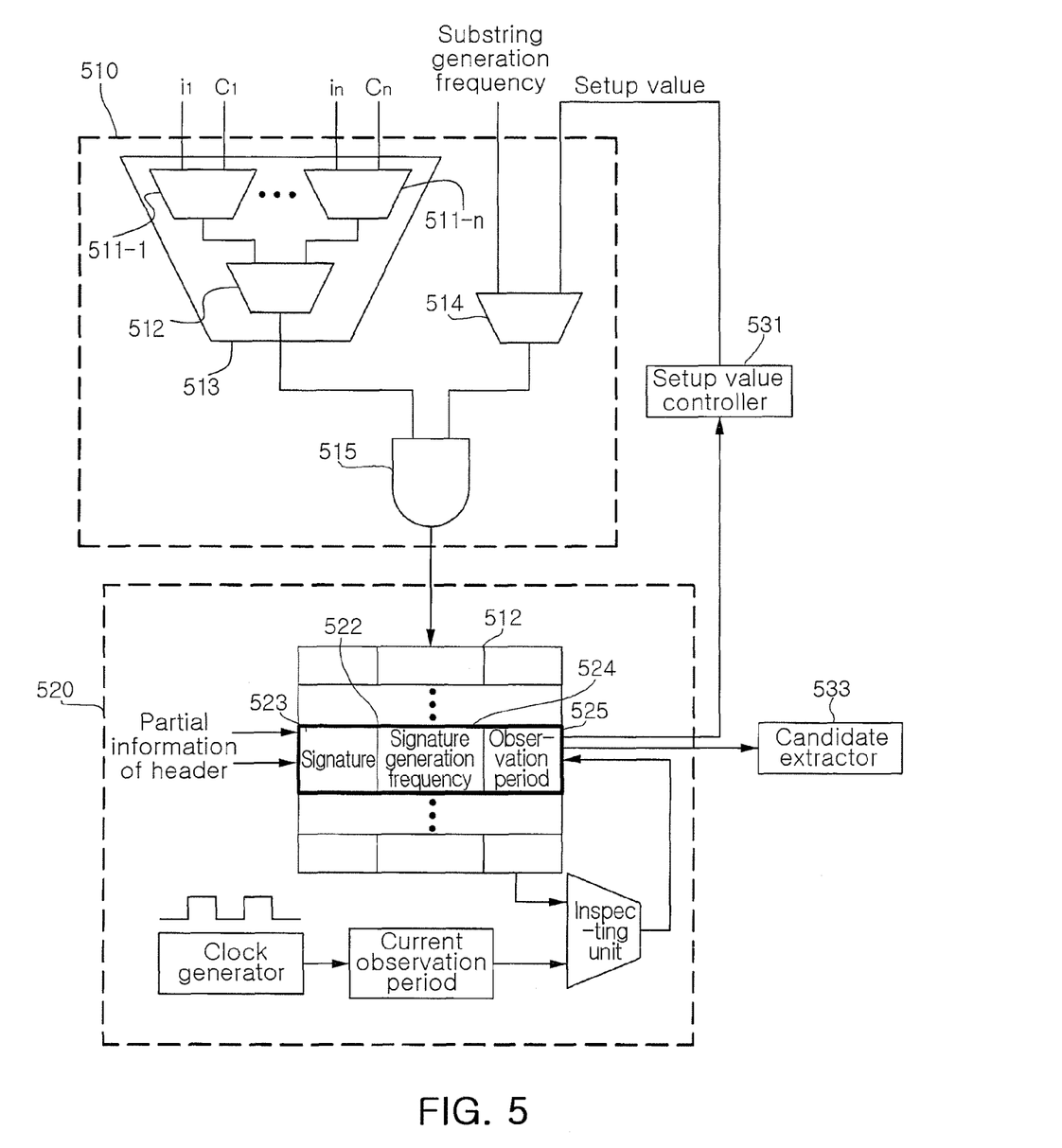
FIG. 5 is a block diagram illustrating a signature candidate extractor according to an embodiment of the present invention.

FIG. 5 is a block diagram illustrating a signature candidate extractor according to an embodiment of the present invention.

Referring to FIG. 5, the configuration and operation of the signature candidate extractor 350 shown in FIG. 3 will be described. The signature candidate extractor 350 includes an attack possibility inspecting unit 510 for inspecting whether a substring of a currently analyzing packet has an attack possibility or not. For example, the attack possibility inspecting unit 510 inspects whether the frequency of generating data related to a currently analyzing substring exceeds a predetermined setup value through a frequency inspecting unit 514. Herein, the frequency inspecting unit 514 receives the frequency from the substring frequency table. Comparators 511-1 to 511-n compare traffic information i1 to in related to a currently analyzing packet with predetermined conditions. Then, a decision unit 512 outputs an analysis result based on the inspection results for each traffic information. Herein, the condition for traffic information can be adjusted by a user, and a condition inspecting unit 513 can be embodied to be reassembled or to be re-designed. If the condition considered in the condition inspecting unit 513 is high, there is a great chance to miss an attacking pattern. Therefore, it is preferable to have a weak condition to reduce the false negative. Also, the address dispersion information of a system exchanging a corresponding packet is essentially required. If a currently analyzing packet is transmitted from a system A to a system B through a protocol C to a port D, it is required to essentially check the number of addresses transmitting a protocol packet C from the system A, or the number of addresses transmitting a packet based on a protocol C to a port D from the system A. Furthermore, the number of systems transmitting a packet based on a protocol B from a system B, or based on a protocol B to a port D. The number of packets related to traffic, the sum of bytes, the number of SYN packets, the number of FIN/RST packets, the number of access failures, or the number of access successes are further included to make a decision. The inspecting units 513 and 514 make a decision through a logical product and a logical sum. A final inspecting unit 515 determines whether a corresponding substring has an attack possibility or not by performing a logical sum on information from the inspecting units 513 and 514. For example, the inspecting units 513 and 514 may determine whether a corresponding substring has an attack possibility or not as follows.

A signature generator 520 processes a substring of a current packet, which is doubtable to have an attack possibility. In case of the doubtable substring, the signature generator 520 generates a signature including the predetermined part of information in a corresponding packet header field and the substring itself. Herein, a substring is not modified data but substring itself. The entry of the signature frequency table 521 is updated based on the generated signature. For example, each entry 522 of the signature frequency table 521 has three values. The three values are a signature 523, a signature generation frequency 524, and an observation period 525. The observation period 525 is used for the same reason of using it in the substring frequency table. For example, the frequency value of an entry in a signature frequency table increases by one in the same observation period or increases by 0 when the observation period changes. Herein, like as the substring frequency table, the increment amount of the frequency of a corresponding entry does not change. Also, the observation period length of the signature frequency table may differ from the observation period length of the substring frequency table. Conventionally, the observation period of the signature frequency table is longer.

A candidate extractor 533 extracts a currently considering signature as a signature candidate when the frequency of generating the currently considering signatures for an observation period in the signature frequency table 512 is larger than a predetermined setup value. Therefore, in order to prevent the frequency of generating hash collisions from increasing, the signature frequency table 521 stores the signature itself. If it is exactly matched with a corresponding signature, the entry value of the table 521 is updated. If there is no entry matched, a new entry is created. When the number of entries is limited like as embodying it in hardware, the entries of the table 521 may be exhausted. Furthermore, when the observation period of the table 521 is long, the table is filled up with entries faster. In this case, an entry having a smallest frequency 524 among entries not updated for the long time is removed and a new entry is generated. Although a system can be normally operated with the signature frequency table 521 filled up, real attacking signatures may be deleted before it is appeared it the entry 522 is too frequently deleted or replaced. Therefore, it is preferable to prevent the entry 522 of the signature frequency table 521 from being too frequently deleted or replaced.

In order to prevent the entry from being too frequently deleted or replaced, the setup value controller 531 controls the setup value of a substring generation frequency transferring it from a substring frequency table to a signature frequency table, thereby controlling the number of entries in a signature frequency table.

The setup value controller 531 performs parts of operations of the controller 280. The setup valuevalue can be decided by a function with the number of entries deleted or replaced in a signature frequency table for an observation period. For example, a reference value for the number of deleting or replacing the entries is defined. The reference value may be defined by a predetermined device that automatically defines a reference value by analyzing the information of a table or a user. If the number of entries deleted or replaced for a current observation period is smaller than a reference value, the setup value of a substring frequency table increases. If the number of entries deleted or replaced for a current observation period is larger than a reference value, the setup value is reduced. Also, the setup valuevalue may be decided by a function with the number of entries deleted or replaced at a signature frequency table and the frequency of a substring in a substring frequency table. Herein, the function with the frequency of generating a substring can be transformed to a numeral value such as the average of substring frequency values or an entropy value. Such a transformation to the numeral value can be performed through on-line by performing a update operation whenever each substring is processed.

As described above, in the attack signature candidate extracting apparatus and method according to the certain embodiment of the present invention, the traffic information is generated by parsing the header information, and the signature candidates having an attack possibility are extracted by extracting substrings of a payload. Therefore, the attack signature candidate extracting apparatus and method can extract the attacking packet signature candidates that provide a low false negative, can deals with a polymorphic worm, and can be embodied in hardware operated in real time in on-line manner.

While the present invention has been shown and described in connection with the preferred embodiments, it will be apparent to those skilled in the art that modifications and variations can be made without departing from the spirit and scope of the invention as defined by the appended claims.

What is claimed is:

1. An apparatus for extracting attacking packet signature candidates comprising:

a processor and a memory;

a packet separator for separating a network packet into a header and a payload;

a header information parser for parsing the header information;

a traffic information generator for generating traffic information based on the parsed value;

a substring extractor, having a processor and a memory, for measuring a frequency of appearing of a substring with a predetermined length in the separated payload for a constant observation period, and extracting a substring having a frequency higher than a predetermined setup value by updating the measured frequency information to a substring frequency table, wherein the updating includes increasing said frequency information of the substring that is less frequently shown previously by a larger increment amount; and a signature candidate extractor for generating a signature by collecting the extracted substring information of the substring frequency table and the generated traffic information, updating a signature frequency table, and extracting a signature candidate with reference to the signature frequency table.

2. The apparatus according to claim 1, further comprising an allowable list information storing unit for interrupting a related process before measuring the frequency of the substring in the substring extractor if the extracted substring information is identical to a pre-stored substring information by storing information about an allowable substring.

3. The apparatus according to claim 1, further comprising a controller for adjusting a setup value which are used to determine a substring in the substring extractor.

4. The apparatus according to claim 3, wherein the controller decides the setup value of the substring extractor as a function of function quantized to the number of entries deleted or replaced from the signature frequency table, or to an average value of substring frequency values in a substring frequency table and entropy.

5. The apparatus according to claim 1, wherein the traffic information is formed of a combination of at least one of a destination address, a source address, a destination port number, a source port number, a protocol, a packet length, and a TCP (transmission control protocol) flag value.

6. The apparatus according to claim 5, wherein an entry of the traffic information include address dispersion information that denotes the number of addresses accessing different destinations where packets satisfying the corresponding combination are transmitted to when the combination includes a source address and related information, or that denotes the number of addresses accessing different sources that transmits packets satisfying the corresponding combination to the destination address when the combination includes a destination address and related information.

7. The apparatus according to claim 6, wherein each entry of the traffic information further includes at least one of the number of packets related traffic, a sum of bytes, the number of SYN packets, the number of FIN/RST packets, the number of access failures, or the number of access successions.

8. The apparatus according to claim 1, wherein the substring extractor transforms a corresponding substring to a numeral values using a one-to-one transformation method that transforms the corresponding substring to an unsigned short value when the length of the corresponding substring is shorter than about two bytes or using a many-to-one transformation method that transforms the corresponding substring by applying a hashing algorithm when the corresponding substring is longer than two bytes, and updates the substring frequency table according to the modified information.

9. The apparatus according to claim 8, wherein the substring frequency table includes a field denoting an observation period of each entry for performing an initialization operation per each entry, and the substring extractor increases substring generation frequency value of the entry when an observation period of a corresponding entry is not elapsed, or initializes a substring generation frequency value of the entry and then increases the substring generation frequency value from a corresponding initialization value when an observation period of a corresponding entry is elapsed.

10. The apparatus according to claim 9, wherein the substring extractor initializes the substring generation frequency value of the corresponding entry to 0 or by a constant rate of a generating value.

11. The apparatus according to claim 9, wherein the substring generation frequency value has a constant increment amount for all substrings or has a different increment amount for each substring.

12. The apparatus according to claim 11, wherein a corresponding increment amount is in reverse proportional to the number of substrings standardized by traffic amount appeared on a network and gives a larger weight to a frequency of a recent observation period when each of the substrings has a different increment amount.

13. The apparatus according to claim 1, wherein the signature candidate extractor generates a signature only when a frequency of the substring frequency table is larger than a predetermined value or the traffic information generated from the traffic information generator satisfies a predetermined condition.

14. The apparatus according to claim 1, wherein the signature frequency table includes a field denoting an observation period of each entry.

15. The apparatus according to claim 14, wherein the signature candidate extractor increases the frequency of signatures if an observation period is not elapsed and increases the frequency of a signature after initializing the frequency of a signature if an observation period is elapsed when a currently analyzing signature is present in the signature frequency table, and increases the frequency of signatures after generating and initializing an new entry for a signature when the currently analyzing signature is not present in the signature frequency table.

16. The apparatus according to claim 14, wherein if the signature candidate extractor is required to generate a new entry when the entries of the signature frequency table are exhausted, the signature candidate extractor replaces an entry having a smallest signature generation frequency among entries not updated for about the longest time with a new entry.

17. A method for extracting an attacking packet signature candidate comprising:
configuring a processor to perform the steps of:
separating a network packet into a header and a payload;
parsing the header information;
generating traffic information based on the parsed value;
measuring a frequency of appearing substrings with a predetermined length in the separated payload for a constant observation period, and extracting a substring having a frequency higher than a predetermined setup value by updating the measured frequency information to a substring frequency table, wherein the updating includes increasing said frequency information of the substring that is less frequently shown previously by a larger increment amount;
extracting a substring with a predetermined length based on information about the updated substring frequency table;
generating a signature by collecting the extracted substring information of the substring frequency table and the generated traffic information, and updating the generated signature information to a signature frequency table; and
extracting a signature candidate with reference to information of the signature frequency table.

18. The method according to claim 17, further comprising interrupting a related process before measuring the frequency of the substring in the substring extractor if the extracted substring information is identical to a pre-stored substring information by storing information about an allowable substring.

19. The method according to claim 17, further comprising adjusting a setup value which are used to determine a substring in extraction of a substring after extracting the signature candidates.

20. The method according to claim 17, wherein the traffic information is formed of a combination of at least one of a destination address, a source address, a destination port number, a source port number, a protocol, a packet length, and a TCP (transmission control protocol) flag value.

21. The method according to claim 20, wherein an entry of the traffic information include address dispersion information that denotes the number of addresses accessing different destinations where packets satisfying the corresponding combination are transmitted to when the combination includes a source address and related information, or that denotes the number of addresses accessing different sources that transmits packets satisfying the corresponding combination to the destination address when the combination includes a destination address and related information.

22. The method according to claim 21, wherein each entry of the traffic information further includes at least one of the number of packets related traffic, a sum of bytes, the number of SYN packets, the number of FIN/RST packets, the number of access failures, or the number of access successions.

23. The method according to claim 17, wherein in the step of updating the substring frequency table, a corresponding substring is transformed to a numeral values using a one-to-one transformation method that transforms the corresponding substring to an unsigned short value when the length of the corresponding substring is shorter than about two bytes or using a many-to-one transformation method that transforms the corresponding substring by applying a hashing algorithm when the corresponding substring is longer than two bytes, and the substring frequency table is updated according to the modified information.

24. The method according to claim 23, wherein the substring frequency table includes a field denoting an observation period of each entry for performing an initialization operation per each entry, and the substring extractor increases substring generation frequency value of the entry when an observation period of a corresponding entry is not elapsed, or initializes a substring generation frequency value of the entry and then increases the substring generation frequency value from a corresponding initialization value when an observation period of a corresponding entry is elapsed.

25. The method according to claim 24, wherein the initialization operation initializes the substring generation frequency value of the corresponding entry to 0 or by a constant rate of a generating value.

26. The method according to claim 24, wherein the substring generation frequency value has a constant increment amount for all substrings or has a different increment amount for each substring.

27. The method according to claim 26, wherein a corresponding increment amount is in reverse proportional to the number of substrings standardized by traffic amount appeared on a network and gives a larger weight to a frequency of a recent observation period when each of the substrings has a different increment amount.

28. The method according to claim 17, wherein the signature is generated when a frequency of a corresponding substring is larger than a predetermined value, and when traffic information generated at the step of generating the traffic information satisfies a predetermined condition.

29. The method according to claim 17, wherein in the step of updating the signature frequency table, the frequency of signatures if an observation period is not elapsed and increases the frequency of a signature after initializing the frequency of a signature if an observation period is elapsed when a currently analyzing signature is present in the signature frequency table, and increases the frequency of signatures after generating and initializing an new entry for a signature when the currently analyzing signature is not present in the signature frequency table.

30. The method according to claim 29, wherein in the step of updating the signature frequency table, an entry having a smallest signature generation frequency among entries not updated for about the longest time is replaced with a new entry if a new entry is required to be created when the entries of the signature frequency table are exhausted.

31. The method according to claim 29, wherein the setup value are decided as a function of frequency quantized to the number of entries deleted or replaced from the signature frequency table, or to an average value of substring frequency values in a substring frequency table or an entropy value interrupting.

* * * * *